United States Patent
Ahmadi Kalateh Ahmad et al.

(10) Patent No.: US 11,339,644 B2
(45) Date of Patent: May 24, 2022

(54) OPTIMIZATION OF RANGING MEASUREMENTS

(71) Applicant: Halliburton Energy Services, Inc., Houston, TX (US)

(72) Inventors: Akram Ahmadi Kalateh Ahmad, Bedford, MA (US); Burkay Donderici, Houston, TX (US); Hsu-Hsiang Wu, Sugarland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 540 days.

(21) Appl. No.: 15/757,946

(22) PCT Filed: Jan. 31, 2017

(86) PCT No.: PCT/US2017/015840
§ 371 (c)(1),
(2) Date: Mar. 6, 2018

(87) PCT Pub. No.: WO2018/143945
PCT Pub. Date: Aug. 9, 2018

(65) Prior Publication Data
US 2019/0032472 A1    Jan. 31, 2019

(51) Int. Cl.
*E21B 47/0228* (2012.01)
*G01V 3/30* (2006.01)
(Continued)

(52) U.S. Cl.
CPC ............ *E21B 47/0228* (2020.05); *E21B 7/04* (2013.01); *E21B 47/13* (2020.05); *G01V 3/30* (2013.01); *G01V 3/34* (2013.01); *E21B 43/2406* (2013.01)

(58) Field of Classification Search
None
See application file for complete search history.

(56) References Cited

U.S. PATENT DOCUMENTS 6,445,307 B1 * 9/2002 Rassi .................... H04B 13/02
                                                        340/854.6
9,360,582 B2    6/2016 Bittar et al.
(Continued)

FOREIGN PATENT DOCUMENTS

WO    2014089402    6/2014
WO    2014098838    6/2014
(Continued)

OTHER PUBLICATIONS

Canadian Search Report and Written Opinion for application No. 3,046,919 dated Aug. 17, 2020.
(Continued)

*Primary Examiner* — Lina M Cordero
(74) *Attorney, Agent, or Firm* — Benjamin Ford; C. Tumey Law Group PLLC

(57) ABSTRACT

Systems and methods for active ranging-while-drilling (ARWD) for collision avoidance and/or well interception. A method for electromagnetic ranging of a target wellbore may include disposing an electromagnetic ranging tool in a wellbore, wherein the electromagnetic ranging tool comprises an electromagnetic transmitter and an electromagnetic receiver; exciting a subterranean formation with the electromagnetic transmitter; adjusting at least one orientation of the electromagnetic transmitter, the electromagnetic receiver, or both the electromagnetic transmitter and the electromagnetic receiver; exciting the target wellbore with the electromagnetic transmitter; measuring at least one component of an electromagnetic signal from the target wellbore with the electromagnetic receiver; and determining at least one ranging parameter of the target wellbore based, at least in part, on the at least one component of the electromagnetic field measured by the electromagnetic receiver.

19 Claims, 12 Drawing Sheets

(51) Int. Cl.
*E21B 47/13* (2012.01)
*E21B 7/04* (2006.01)
*G01V 3/34* (2006.01)
*E21B 43/24* (2006.01)

(56) References Cited

U.S. PATENT DOCUMENTS

| | | |
|---|---|---|
| 9,506,326 B2 | 11/2016 | Hay et al. |
| 9,752,426 B2 | 9/2017 | Wu et al. |
| 2011/0006773 A1* | 1/2011 | Bittar .................. E21B 7/046 |
| | | 324/333 |
| 2013/0311094 A1 | 1/2011 | Donderici et al. |
| 2011/0227578 A1 | 9/2011 | Hall et al. |
| 2011/0308794 A1 | 12/2011 | Bittar et al. |
| 2013/0057287 A1 | 3/2013 | Le et al. |
| 2013/0226459 A1 | 8/2013 | Gorek |
| 2013/0228375 A1 | 9/2013 | Hallundbeak |
| 2013/0241561 A1* | 9/2013 | Allen .................... G01V 3/28 |
| | | 324/338 |
| 2013/0249561 A1 | 9/2013 | Knizhnik et al. |
| 2014/0032116 A1* | 1/2014 | Guner .................... G01V 3/30 |
| | | 702/6 |
| 2015/0034312 A1 | 2/2015 | Mcelhinney et al. |
| 2015/0268371 A1 | 9/2015 | Donderici et al. |
| 2015/0331139 A1 | 11/2015 | San Martin et al. |
| 2015/0369952 A1* | 12/2015 | Wu ........................ G01V 3/30 |
| | | 702/7 |
| 2016/0116623 A1 | 4/2016 | Golla et al. |
| 2016/0187524 A1* | 6/2016 | Suhami .................. G01V 3/30 |
| | | 324/339 |
| 2016/0216397 A1 | 7/2016 | Donderici et al. |
| 2016/0258275 A1 | 9/2016 | Wu et al. |
| 2016/0265343 A1 | 9/2016 | Donderici et al. |
| 2016/0273339 A1 | 9/2016 | Wu |
| 2016/0273340 A1 | 9/2016 | Roberson et al. |
| 2016/0273341 A1 | 9/2016 | Wu et al. |
| 2016/0273345 A1* | 9/2016 | Donderici .............. G01V 3/26 |
| 2017/0254193 A1* | 9/2017 | Wu ...................... E21B 43/305 |
| 2017/0261633 A1* | 9/2017 | Morris .................. E21B 49/00 |
| 2017/0261635 A1* | 9/2017 | Morris .................... G01V 3/30 |
| 2017/0261636 A1* | 9/2017 | Morris .................... G01V 3/08 |
| 2019/0032472 A1 | 1/2019 | Ahmadi Kalateh Ahmad et al. |
| 2019/0078432 A1* | 3/2019 | Ahmadi Kalateh Ahmad ............ |
| | | E21B 7/04 |

FOREIGN PATENT DOCUMENTS

| | | |
|---|---|---|
| WO | 2015047865 | 2/2015 |
| WO | 2015047953 | 4/2015 |
| WO | 2018143945 | 8/2018 |

OTHER PUBLICATIONS

International Search Report and Written Opinion for application No. PCT/US2017/015840 dated Oct. 26, 2017.

Canadian Search Report and Written Opinion for application No. 3,046,919 dated Feb. 18, 2021.

* cited by examiner

OPTIMIZATION OF RANGING MEASUREMENTS

BACKGROUND

Wellbores drilled into subterranean formations may enable recovery of desirable fluids (e.g., hydrocarbons) using a number of different techniques. Knowing the location of a target wellbore may be important while drilling a second wellbore. For example, in the case of a target wellbore that may be blown out, the target wellbore may need to be intersected precisely by the second (or relief) wellbore in order to stop the blow out. Another application may be where a second wellbore may need to be drilled parallel to the target wellbore, for example, in a steam-assisted gravity drainage ("SAGD") operation, wherein the second wellbore may be an injection wellbore while the target wellbore may be a production wellbore. Yet another application may be where knowledge of the target wellbore's location may be needed to avoid collision during drilling of the second wellbore.

Electromagnetic ranging tools may be employed in subterranean operations to determine direction and distance between two wellbores. Electromagnetic ranging tools may use different techniques to obtain current on a conductive member in the target wellbore. Approaches may include directly injecting a current into the conductive member and/or inducing a current on a conductive member by transmitting electromagnetic fields by coil antennas positioned in a second wellbore. The induced current in turn may cause the casing to radiate a secondary electromagnetic field. In another approach, an electrode type source may be used to induce current on the conductive member. The gradient of the magnetic field radiated by the conductive member in addition to the magnetic field itself may be measured. Using a relationship between the magnetic field and its gradient, a ranging measurement may be calculated. Alternatively, an inversion may be used to determine the range, in which a forward model of the signal that may be received at the ranging tool may be needed. The inversion process may try to find the formation and well parameters that would match the forward model with the measurements made by the tool.

BRIEF DESCRIPTION OF THE DRAWINGS

These drawings illustrate certain aspects of some examples of the present disclosure, and should not be used to limit or define the disclosure.

DETAILED DESCRIPTION

Figure 1:
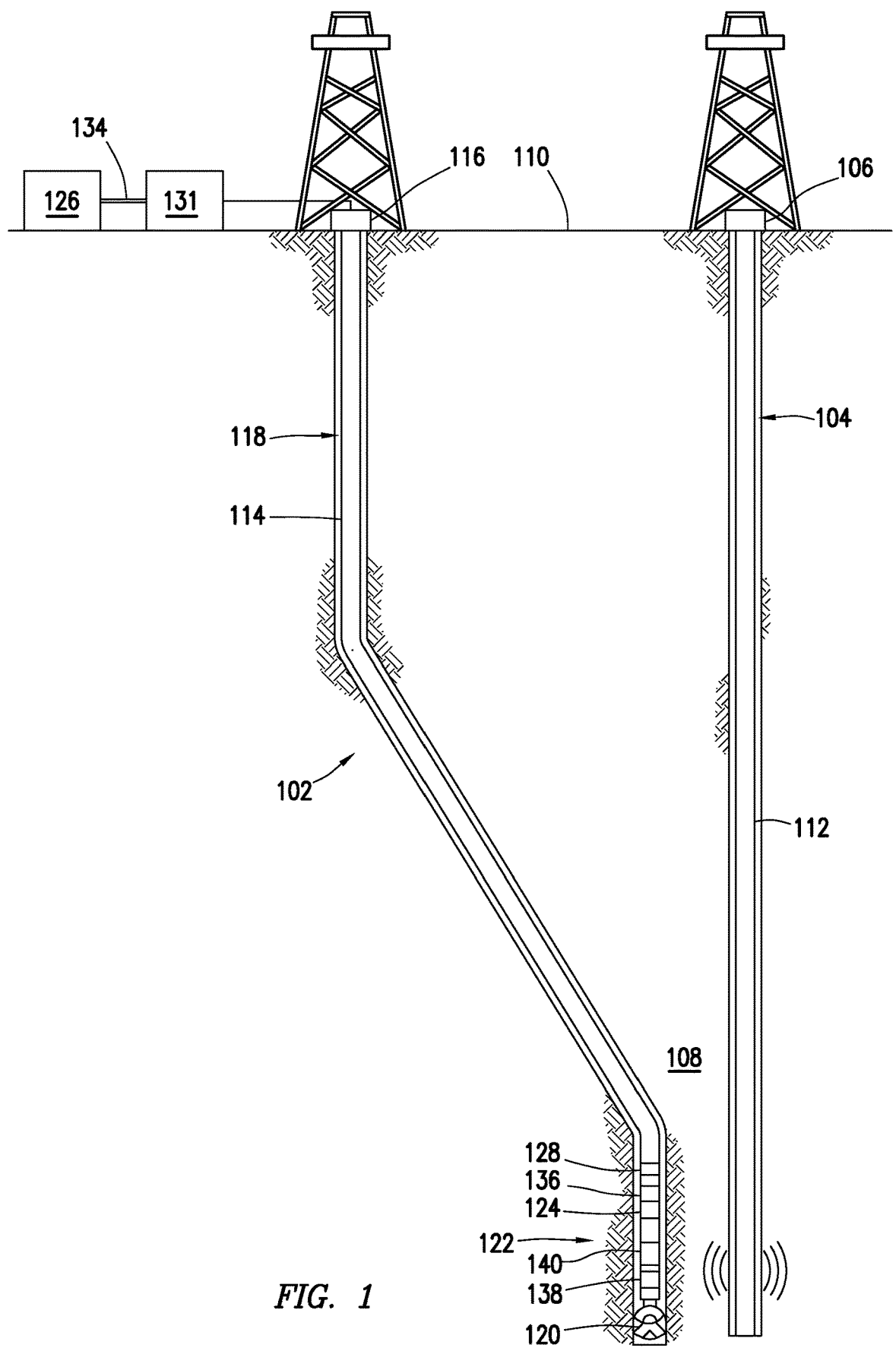
FIG. 1 is a schematic illustrates of an example electromagnetic ranging system in a wellbore.

This disclosure may generally relate to electromagnetic (EM) ranging methods for well intervention, well avoidance, and steam assisted gravity drainage (SAGD) applications, among others. More specifically, it may describe systems and methods for adjusting a tilt angle between the transmitter and receiver orientations to avoid the effect of direct coupling, adjusting the tilt angles to optimally illuminate the target wellbore, and/or adjusting the tilt angles to reduce shoulder effects in high frequency ranging measurements. These tilt angles may allow for the cancellation of a direct signal, but also may establish a XX/YY component which may be maximally sensitive to target wellbores in ranging applications.

In a downhole EM ranging tool with EM transmitters and EM receivers, the received voltage at EM receivers may have two main contributors. The first signal may be the direct signal which may be the direct coupling between the EM transmitters and EM receivers. The second signal may be the signal due to the induced currents on the target wells. When the transmitter and EM receivers are close and the target well is far, the direct signal may become dominant and may make the ranging measurement difficult or even infeasible. This may usually be more pronounced at a lower frequency.

Existing approaches to eliminate direct signal may utilize perpendicular coils (X/Y vs. Z) or bucking. The first approach may require an X-Y coil which may be difficult to build mechanically. The second approach may require an additional coil antenna. The additional coil antenna may be electrically connected to the main sensor with opposite winding; and its position and gain may be adjusted such that a cancellation may be achieved in the direct signal. In this disclosure a direct signal cancellation approach that (i) can be built easily and (ii) does not require an additional coil antenna, is described.

Wells generally may have conductive members (e.g., metallic (such as steel) casings) around them to support the well structure and prevent collapsing of the borehole wall. Since the conductive members may be much more conductive than the formation around it, a strong coupling of the electric field to a conductive member (e.g., in the target wellbore) may occur. This coupling of the electric field may produce a conduction current on the conductive member when an electric excitation is introduced to the system. This current may then induce a magnetic field around the conductive member. This magnetic field may be considered an electromagnetic signal from the target wellbore. At least one component (e.g., magnitude of the magnetic field) may be detected by magnetic field sensors (e.g., EM receivers). EM receivers may be coil antennas, solenoids, or magnetometers. Coil antennas may have a magnetic dipole in a certain direction and hence they may only sensitive to the component of the magnetic field in that direction.

Adjusting at least one orientation of the transmitter and EM receivers (e.g., tilt angles) may provide a better ranging measurement. This adjustment may lead to canceling direct coupling. In addition, this adjustment may provide stronger signals at the EM receivers and increase the accuracy of ranging measurement in layered formations. Any of a variety of suitable techniques for adjusting at least one orientation of the transmitters and/or receivers may be employed, including mechanical adjustment, synthetic adjustment, and combinations thereof. For transmitters and EM receivers in the form of coil antenna, the coil antenna may be wound around the electromagnetic ranging tool with an angle to implement the tilted coil. For the solenoids, the angle of their core may be adjusted along the desired tilt angle. Magnetometer sensors may be mounted the way that the measured field component is positioned in the direction of the desired tilted angle. In LWD (logging-while-drilling) applications, tilted coil approach may be a mode of operation due to mechanical problems associated with the other antenna types. The tilted coil approach may also provide a strong signal.

Adjusting a tilt angle between the transmitter and EM receiver orientations to avoid the effect of direct coupling: In ranging calculations, a scattered signal from a target wellbore may be of interest. This target signal may be used for calculating ranging parameters, such as the distance and direction to the target wellbore. Besides the signal from the target wellbore, EM receivers may also receive the direct coupling signal from the transmitter which may introduce errors in ranging calculations. The direct coupling signal between the transmitter and EM receiver may also become dominant and may saturate the total signal and make the scattered signal measurement difficult. The elimination (or mitigation) of the direct coupling may be achieved by applying a special tilt angle for the transmitter and EM receiver's orientation. The transmitter and EM receivers may be placed on the EM ranging tool with a special tilt angle. This special tilt angle may correspond to the angle at which the magnetic dipole of the EM receiver is perpendicular to the fields of the transmitter in free space. The proper angle to provide direct coupling cancelation may be obtained by computer modeling simulations or may be obtained experimentally. It may be done by manually changing the tilt angle to find the tilt angle in which the direct coupling may be zero (or very close to zero). The appropriate EM receiver's tilt angle may be adjusted according to the transmitter's tilt angle. The tilt angle may also be adjusted synthetically, for example, by selectively energizing coils.

Adjusting the tilt angles to optimally illuminate the target wellbore: In a downhole EM ranging system, the transmitter may introduce a magnetic flux around the target well and may induce currents on the target well. To be able to have a successful ranging measurement, the induced current on the target well should be strong enough to provide sufficient signal at the EM receivers which may be located on the bottom hole assembly ("BHA"). The orientation of the transmitter with respect to the target wellbore may be important to be able to illuminate the target wellbore properly and to provide a strong signal at the EM receivers. A method of adjusting the transmitter tilt angle is disclosed, for example, to provide an efficient way of illuminating target wells. The tilt angle of the transmitter may be adjusted based on the orientation of the target wellbore. During drilling, this adjustment may be performed by using the orientation of the target wellbore that may have been calculated at previous depths. With the previous calculated orientation of the target wellbore, the transmitter tilt angle may be set as a start point. The transmitter tilt angle may be adjusted according to a maximum signal at the EM receivers and the EM receivers' tilt angle may also be adjusted to provide direct coupling cancelation. The optimum combination of the transmitter and EM receiver tilt angles which are associated to the maximum signal as well as canceling direct coupling may be recorded. The optimum combination tilt angles may be used for a ranging measurement. It may also possible to adjust the EM receiver tilt angles to optimize sensitivity to the target wellbore, as well. This process may be continued for subsequent drilling depths.

Adjusting the tilt angles to reduce shoulder effects in high frequency ranging measurements: The electromagnetic ranging tool with the transmitters and EM receivers may be used in a formation with layered structure having different resistivity. To eliminate the effect of the layers on the measurement, the transmitter or EM receivers may be aligned in parallel to layers allowing the dipole moment of the sensor to be positioned perpendicular to the layered direction.

Systems and methods of the present disclosure may be implemented, at least in part, with an information handling system. An information handling system may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

The systems and methods disclosed herein may be applicable to parallel to T-intersection scenarios. There also may be no need to use an additional bucking receiver system to eliminate direct signal. Additionally, by adjusting the transmitter and EM receiver orientations, a strong signal may be provided at the EM receivers allowing for a large range of detection.

FIG. 1 illustrates an electromagnetic ranging system 102. As illustrated, a target wellbore 104 may extend from a first wellhead 106 into a subterranean formation 108 from a surface 110. Generally, target wellbore 104 may include horizontal, vertical, slanted, curved, and other types of wellbore geometries and orientations. Target wellbore 104 may be cased or uncased. A conductive member 112 may be disposed within target wellbore 104 and may comprise a metallic material that may be conductive and magnetic. By way of example, conductive member 112 may be a casing, liner, tubing, or other elongated steel tubular disposed in target wellbore 104. Determining the position and direction of target wellbore 104 accurately and efficiently may be required in a variety of applications. For example, target wellbore 104 may be a "blowout" well. Target wellbore 104 may need to be intersected precisely by a second wellbore 114 in order to stop the "blowout." Alternatively, it may be desired to avoid collision with target wellbore 104 in drilling second wellbore 114 or it may be desired to drill the second wellbore parallel to the target wellbore 104, for example, in SAGD applications. In examples, target wellbore 104 may not be accessible and/or information about the position and structure of target wellbore 104 may not be available. As will be discussed in more detail, electromagnetic ranging system 102 may be used for determining the location of target wellbore 104 with respect to second wellbore 114.

With continued reference to FIG. 1, second wellbore 114 may also extend from a second wellhead 116 that extends into subterranean formation 108 from surface 110. Generally, second wellbore 114 may include horizontal, vertical, slanted, curved, and other types of wellbore geometries and orientations. Additionally, while target wellbore 104 and second wellbore 114 are illustrated as being land-based, it should be understood that the present techniques may also be applicable in offshore applications. Second wellbore 114 may be cased or uncased. In examples, a conveyance 118 may begin at second wellhead 116 and traverse second wellbore 114. A drill bit 120 may be attached to a distal end of conveyance 118 and may be driven, for example, either by a downhole motor and/or via rotation of conveyance 118 from surface 110. Drill bit 120 may be a part of BHA 122 at distal end of conveyance 118. While not illustrated, BHA 122 may further comprise one or more of a mud motor, power module, steering module, telemetry subassembly, and/or other sensors and instrumentation as will be appreciated by those of ordinary skill in the art. As will be appreciated by those of ordinary skill in the art, BHA 122 may be a measurement-while drilling (MWD) or logging-while-drilling (LWD) system.

Electromagnetic ranging system 102 may comprise an EM ranging tool 124. EM ranging tool 124 may be operatively coupled to conveyance 118 (e.g., wireline, slickline, coiled tubing, pipe, drill pipe, downhole tractor, or the like) which may provide electrical connectivity, as well as mechanical suspension, for EM ranging tool 124.

EM ranging tool 124 may be a part of BHA 122. EM ranging tool 124 may be used for determining the distance and direction to target wellbore 104. Additionally, EM ranging tool 124 may be connected to and/or controlled by information handling system 126, which may be disposed on surface 110. In examples, information handling system 126 may communicate with EM ranging tool 124 through a communication line (not illustrated) disposed in (or on) conveyance 118. In examples, wireless communication may be used to transmit information back and forth between information handling system 126 and EM ranging tool 124. Information handling system 126 may transmit information to EM ranging tool 124 and may receive as well as process information recorded by EM ranging tool 124. In addition, EM ranging tool 124 may include a downhole information handling system 128, which may also be disposed on BHA 122. Downhole information handling system 128 may include, a microprocessor or other suitable circuitry, for estimating, receiving and processing signals received by the EM ranging tool 124. Downhole information handling system 128 may further include additional components, such as memory, input/output devices, interfaces, and the like. While not illustrated, the EM ranging tool 124 may include one or more additional components, such as analog-to-digital converter, filter and amplifier, among others, that may be used to process the measurements of the EM ranging tool 124 before they may be transmitted to surface 110. Alternatively, raw measurements from EM ranging tool 124 may be transmitted to surface 110.

In examples, EM ranging tool 124 may comprise a transmitter 136 and EM receivers 138 and 140. It should be noted that EM ranging tool 124 may comprise a plurality of transmitters 136 and/or a plurality of EM receivers 138 and 140. The plurality of transmitters 136 and the plurality of EM receivers 138 and 140 may be disposed along a longitudinal axis of the EM ranging tool 124. The plurality of transmitters 136 may include a magnetic source, such as a magnet assembly (containing permanent and/or electromagnets), capable of inducing a magnetization in conductive and conductive member 112 disposed in target wellbore 104. The transmitter 136 and EM receivers 138 and 140 may be of an induction type. The transmitter 136 may include coil antenna and solenoids. As disclosed, the concepts that are described herein are valid for any type of EM receiver, including, wire antenna, toroidal antenna and/or azimuthal button electrodes, and/or coil antenna. In order to achieve the orientation that is needed for any coil antenna, a bi-axial or tri-axial configuration may be used. In this case, a combination of multiple transmitter/receivers may be used to generate an antenna that may effectively be directed at The EM ranging tool 124 (shown in FIG. 1) may be operated in real-time, including downhole processing for a range and direction to a target wellbore 104 (shown in FIG. 1), which may allow integration with survey data.

Any suitable technique may be used for transmitting signals from EM ranging tool 124 to surface 110, including, but not limited to, wired pipe telemetry, mud-pulse telemetry, acoustic telemetry, and electromagnetic telemetry. While not illustrated, BHA 122 may include a telemetry subassembly that may transmit telemetry data to the surface. A transmitter in the telemetry subassembly may be operable to generate pressure pulses in the drilling fluid that propagate along the fluid stream to surface 110. At surface 110, pressure transducers (not shown) may convert the pressure signal into electrical signals for a digitizer 131. Digitizer 131 may supply a digital form of the telemetry signals to information handling system 126 via a communication link 134, which may be a wired or wireless link. The telemetry data may be analyzed and processed by information handling system 126. For example, the telemetry data could be processed to determine location of target wellbore 104. With the location of target wellbore 104, a driller could control the BHA 122 while drilling second wellbore 114 to intentionally intersect target wellbore 104, avoid target wellbore 104, and/or drill second wellbore 114 in a path parallel to target wellbore 104.

Figure 2A:
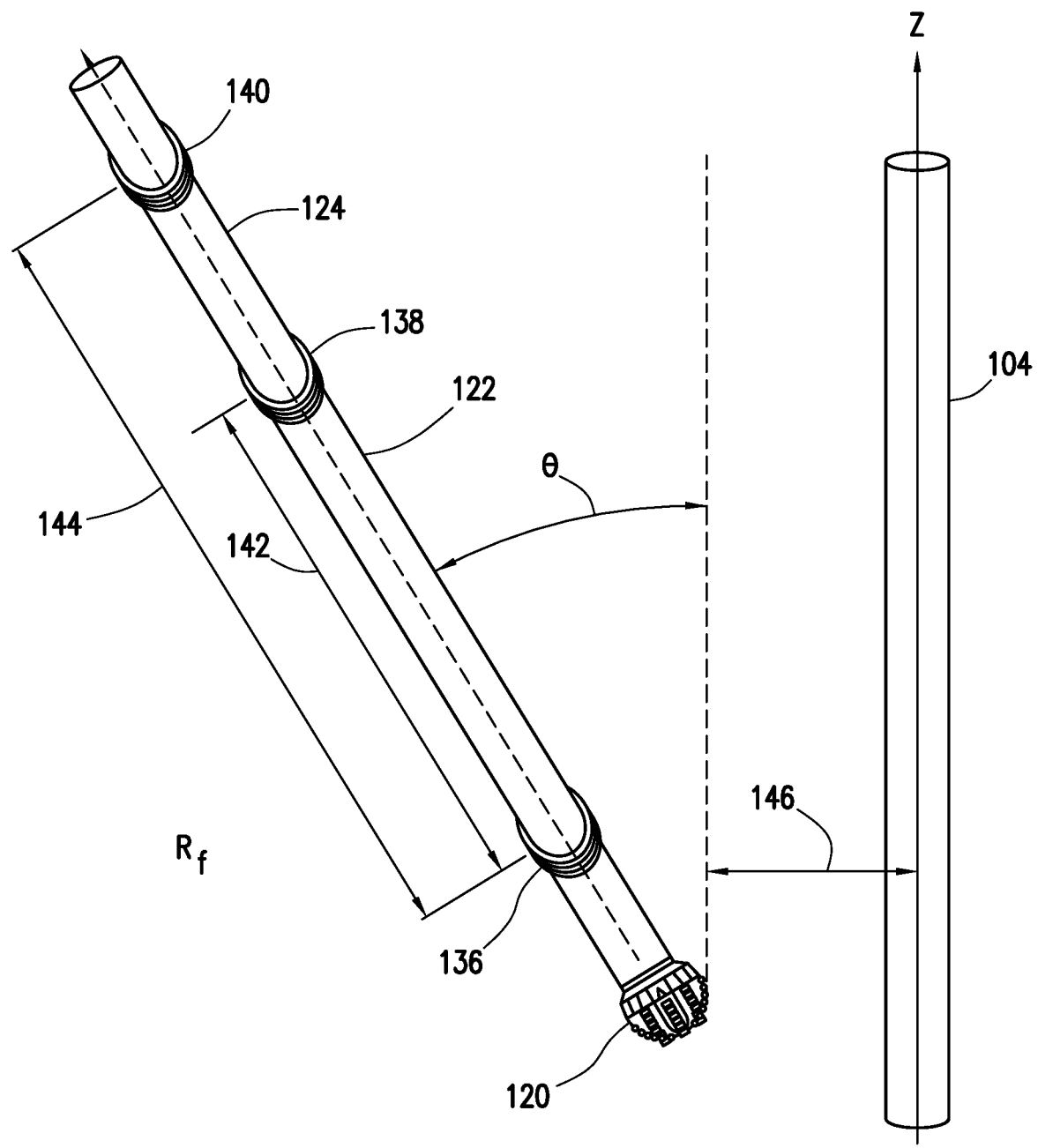
FIG. 2A is a schematic illustration of a BHA including an electromagnetic ranging tool.

FIG. 2A illustrates BHA 122 including EM ranging tool 124. A transmitter 136 may be installed on the EM ranging tool 124 at a distance 142 from EM receiver 138 and distance 144 from EM receiver 140 to excite current on the target wellbore 104. Transmitter 136, as illustrated, may be a coil antenna. Distance 146 may be the distance from drill bit 120 to target wellbore 104. θ may be the inclination angle of BHA 122. EM receivers 138 and 140 may be any suitable receiver, including tilted coils as shown. The transmitter 136 and EM receivers 138 and 140 may be wound around EM ranging tool 124. The idea disclosed here may necessitate the proper orientation of transmitter 136 and EM receivers 138 and 140 to provide a strong signal coming from the target wellbore 104 and to minimize the direct coupling signal from the transmitter 136. $R_f$ may be the formation resistivity.

Target wellbore 104 may be assumed to be thin hollow metal with the following properties: $\sigma=10^6$ S/m, $\varepsilon_r=1$, $\mu_r=60$, OD=8", and ID=7". The length of the target wellbore 104 may be assumed to be 1000 m and the transmitter 136 may be assumed to be located around the mid-point of the target wellbore 104 with tilt angle of $\theta_T$. The drill bit 120 may be located at a distance 146 from the target wellbore 104. The transmitter 136 and EM receivers 138, 140 coils diameter may be 6.75" and may have N=100 turns. The transmitter 136 may be carrying current I=1 A and EM receivers 138, 140 with tilt angle of $\theta_R$ may be in a spacing of distance 142, 144, respectively, from the transmitter 136 on BHA 122. The formation may be assumed to be homogeneous with resistivity of $R_f=10\Omega$.m and $\varepsilon_{fr}=\mu_{fr}=1$.

Figure 2B:
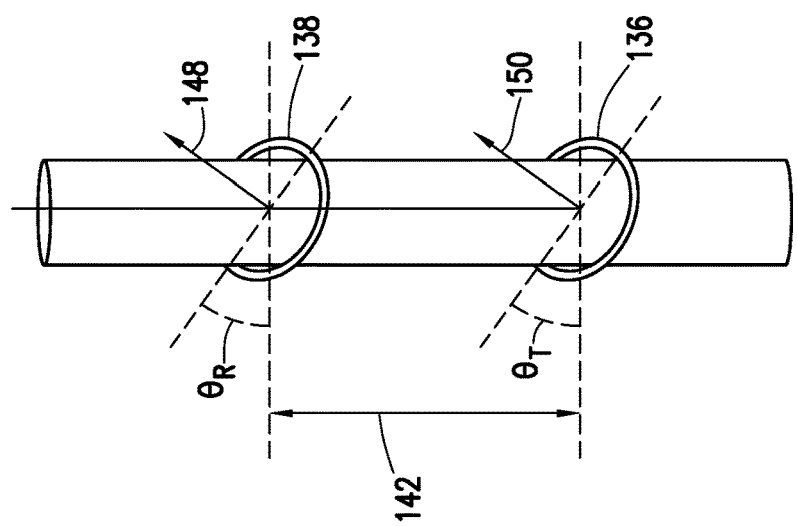
FIG. 2B is a schematic illustration of an electromagnetic ranging tool including a transmitting tilted coil, receiver and dipole moments.

FIG. 2B illustrates EM ranging tool 124 including transmitter 136, EM receiver 138 and dipole moments 148 and 150. Dipole moment 148 may be perpendicular to receiver tilt angle $\theta_R$ and dipole moment 150 may be perpendicular to transmitter tilt angle $\theta_T$. As disclosed herein, the receiver tilt angle $\theta_R$ and/or transmitter tilt angle $\theta_T$ may be adjusted, for example, to minimize/eliminate direct coupling between the transmitter and EM receiver 138, optimally illuminate the target wellbore 104, and/or reduce shoulder effects in high frequency ranging measurements. Distance 142 may be the distance between transmitter 136 and EM receiver 138. As illustrated on FIGS. 2A and 2B, transmitter 136 and EM receiver 138 may both be in the form of coil antenna, such as tilted coils; however, other suitable EM sensors may also be used.

Those of ordinary skill in the art will appreciate that analysis of the EM received data at EM receivers 138 and 140 may provide ranging parameters for the target wellbore 104, including, a distance and direction between a target wellbore 104 and the EM ranging tool 124. An inversion algorithm based on the laws governing EM fields may be used to determine the position of the EM transmitter from the EM receivers. This inversion algorithm may be based on deterministic and/or stochastic methods of optimization. Signal data obtained from the electromagnetic ranging tool may be used in an inversion step to produce the ranging parameters.

Figure 3:
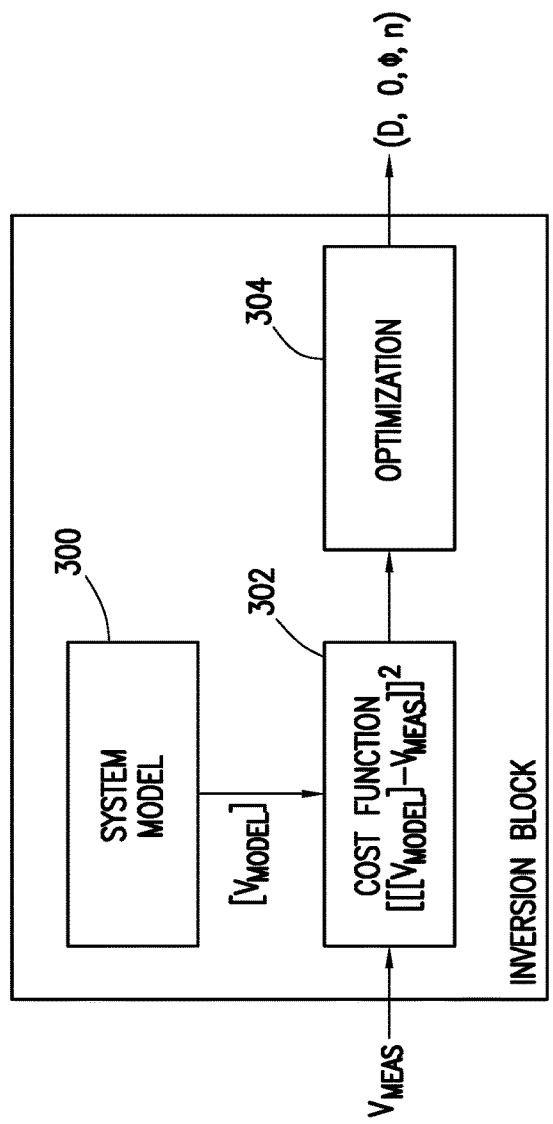
FIG. 3 illustrates a flow diagram for distance and inclination calculations.

FIG. 3 illustrates an inversion block diagram for ranging calculations. Block 300 may include a system model including $[V]_{Model}$. The signal data coming from a pre-modeling system may be represented by $V_{model}$. The magnetic field sensor measurements may be represented by $V_{meas}$. Block 300 may provide $[V]_{Model}$ to block 302. Block 302 may include a cost function where $(|[V]_{Model}-V_{meas}|)^2$. Block 304 may optimize the cost function to provide target well parameters, such as D, θ, φ and n. Optimization algorithms making iterative estimations may be used to match the $V_{meas}$ and $V_{model}$ and may provide a minimized cost function. The ranging parameters (e.g., distance D, inclination angle θ, azimuth angle φ and orientation n) may be concluded out of the matching $V_{meas}$ and $V_{model}$ process, as long as a sufficiently diverse set of measurements are provided. For example, if only D and θ are unknown two measurements may sufficient for inversion. In the case φ is an unknown as well; multiple measurements at different rotation angles may be used in the inversion to uniquely compute φ. In case n unit vector is unknown, it may be found out using either by including multiple depth information, multiple transmitter-receiver spacings, or multiple channels with different tilt angles. In FIG. 3 $[V]_{Model}$ may be the voltage at different target well parameters: distance (D), direction (θ, φ) and target orientation n. $[V]_{model}$ may include the voltage received by each sensor (e.g., transmitter 136, EM receivers 138, 140, shown in FIG. 1) and obtained from pre-modeling the system. $V_{meas}$ may be the voltage measured by the sensors. D, θ, φ and n may be the distance, inclination and azimuth angle to the target wellbore 104 (not shown) and target orientation, respectively.

Figure 4A:
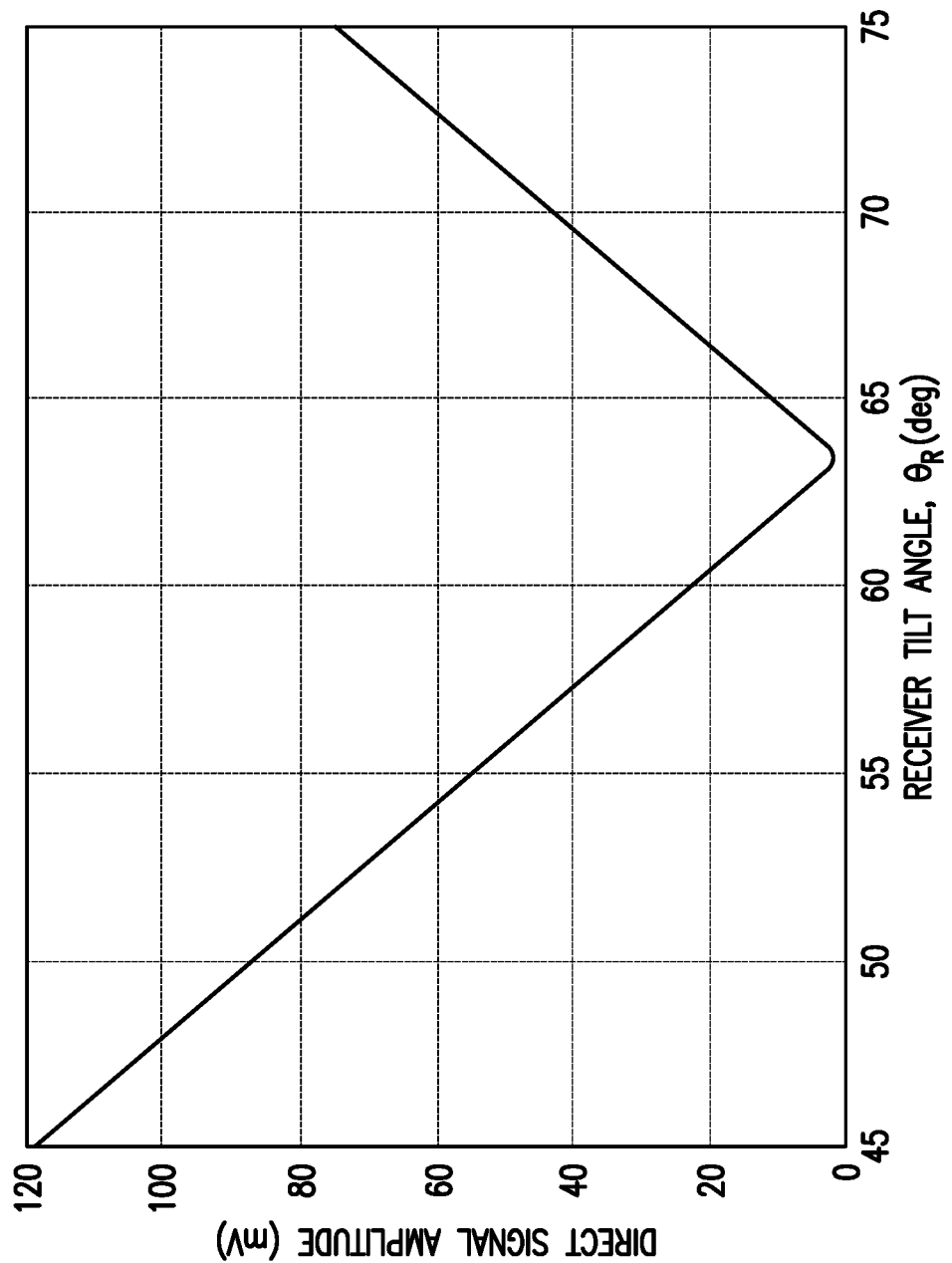
FIG. 4A illustrates a graph showing an effect of receivers: Direct Coupling Signals vs. Receiver Tilt Angles.
Figure 4B:
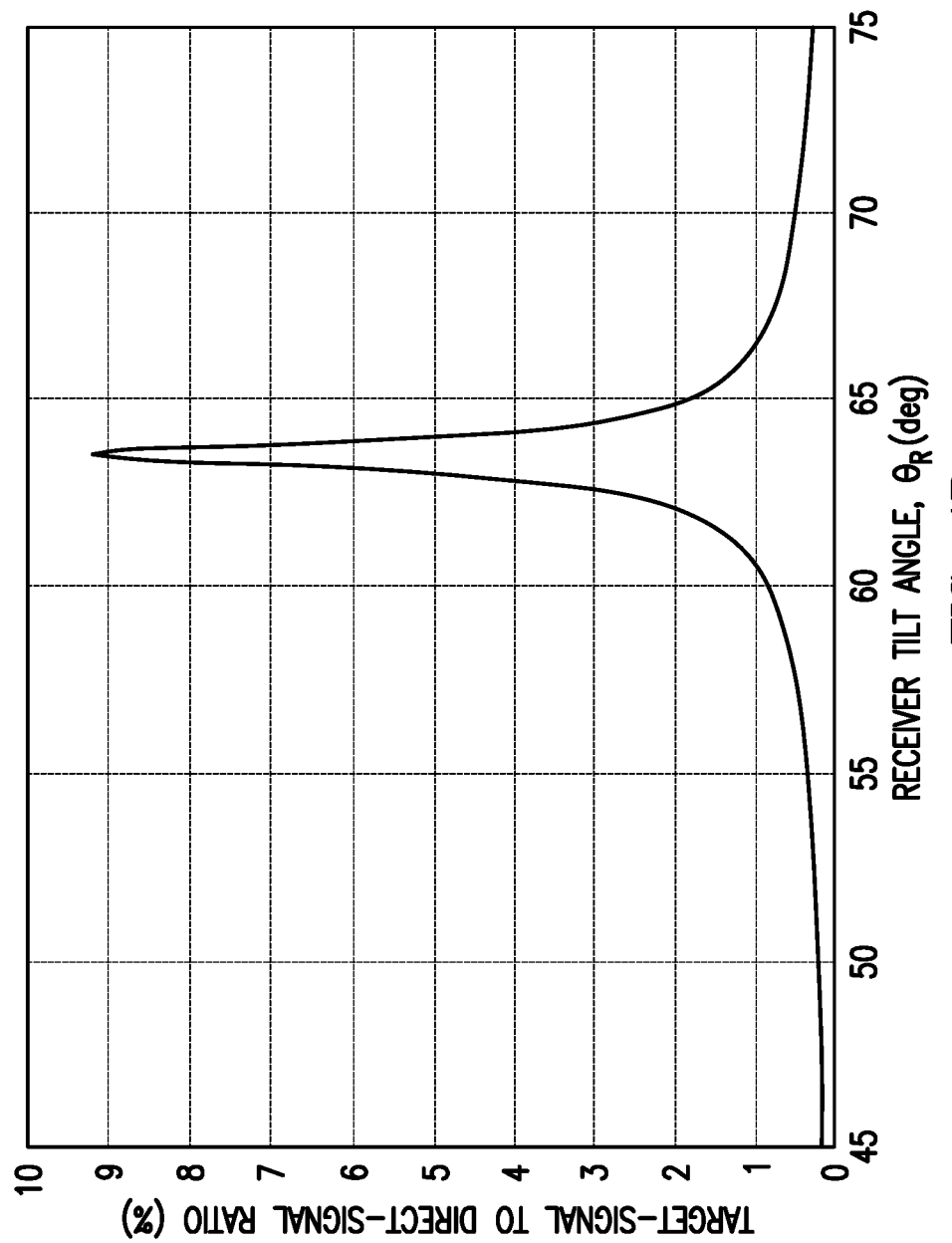
FIG. 4B illustrates a graph showing an effect of receivers: Signal Ratios of Target-signals to Direct-signals vs. Receiver Tilt Angles.

FIG. 4A illustrates a graph showing an effect of EM receivers 138, 140 (shown in FIG. 1) tilt angles adjustment: Direct Coupling Signals vs. Receiver Tilt Angles. (Freq.=2 kHz, $\theta_T=45°$, $R_f=10\Omega$.m, D=10 m, θ=0°. FIG. 4A shows the direct signal amplitude vs. the receiver tilt angle where the transmitter 136 (shown in FIG. 2A) tilt angle is $\theta_T=45°$ and transmitter-receiver spacing may be 10 feet. For this example, it may be considered that the BHA 122 (shown in FIG. 1) and the target wellbore 104 (shown in FIG. 2A) may be in the same plane and θ=0. The transmitter 136 may be carrying 1 A current at an operating frequency of f=2 kHz. It can be seen that at around $\theta_R=63.4°$ direct signal has been eliminated and as shown in FIG. 4B the target-signal to direct-signal ratio is maximum around this tilt angle. For the ranging calculation, at least two measurements may be required. At least two sensors (e.g., transmitter 136, EM receivers 138, 140) may be located on the BHA 122 by a distance from each other to do the measurements. Each sensor's tilt angle may be adjusted separately to eliminate the direct coupling. FIG. 4B illustrates a graph showing an effect of EM receivers 138, 140 (shown in FIG. 1) tilt angles adjustment: Signal Ratios of Target-signals to Direct-signals vs. Receiver Tilt Angles. (Freq.=2 kHz, $\theta_T=45°$, $R_f=10\Omega$.m, D=10 m, θ=0°.

Figure 5A:
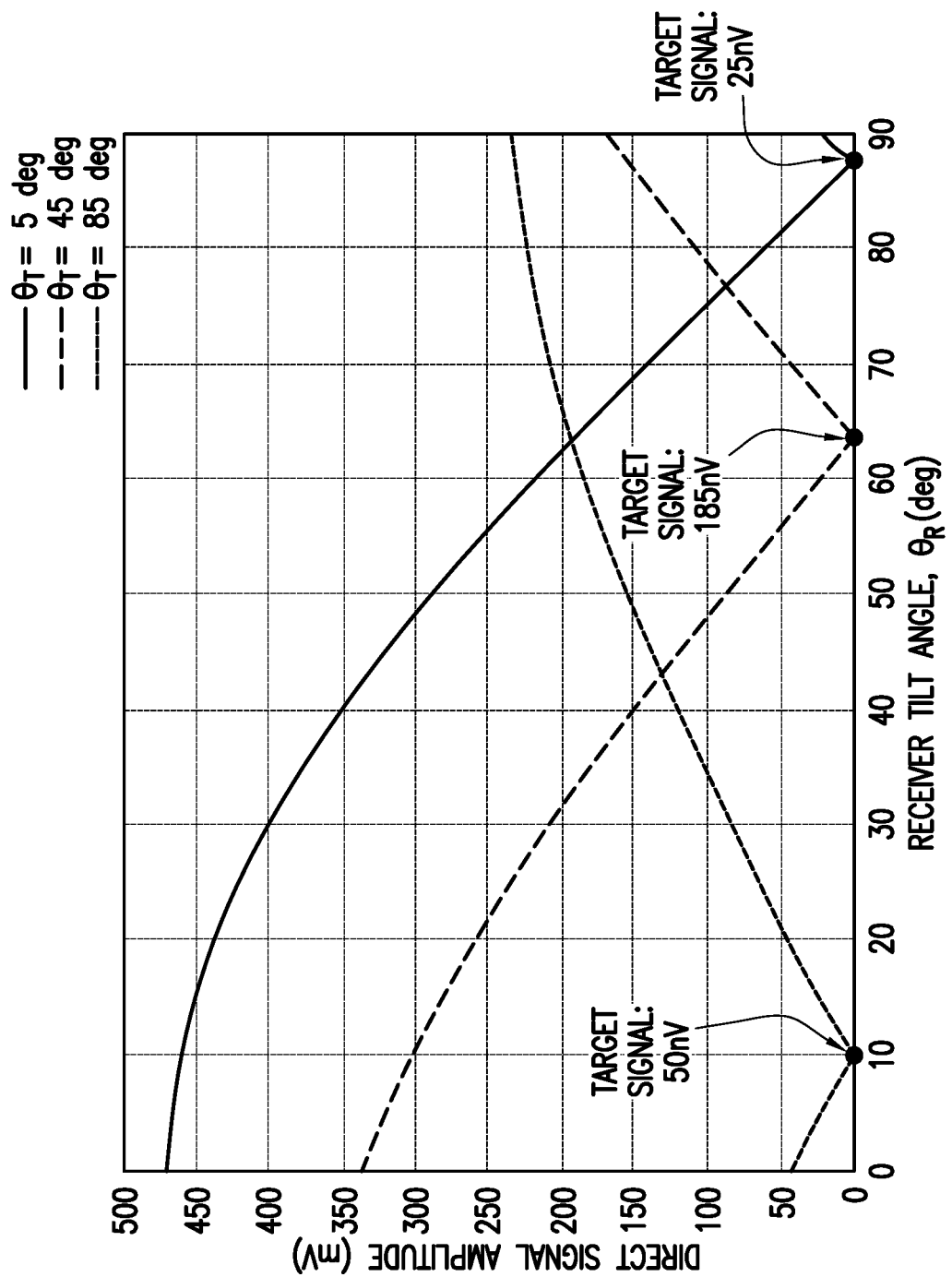
FIG. 5A illustrates a graph showing an effect of a transmitting tilted coil tilt angle adjustment: Direct Coupling Signals vs. Receiver Tilt Angles.
Figure 5B:
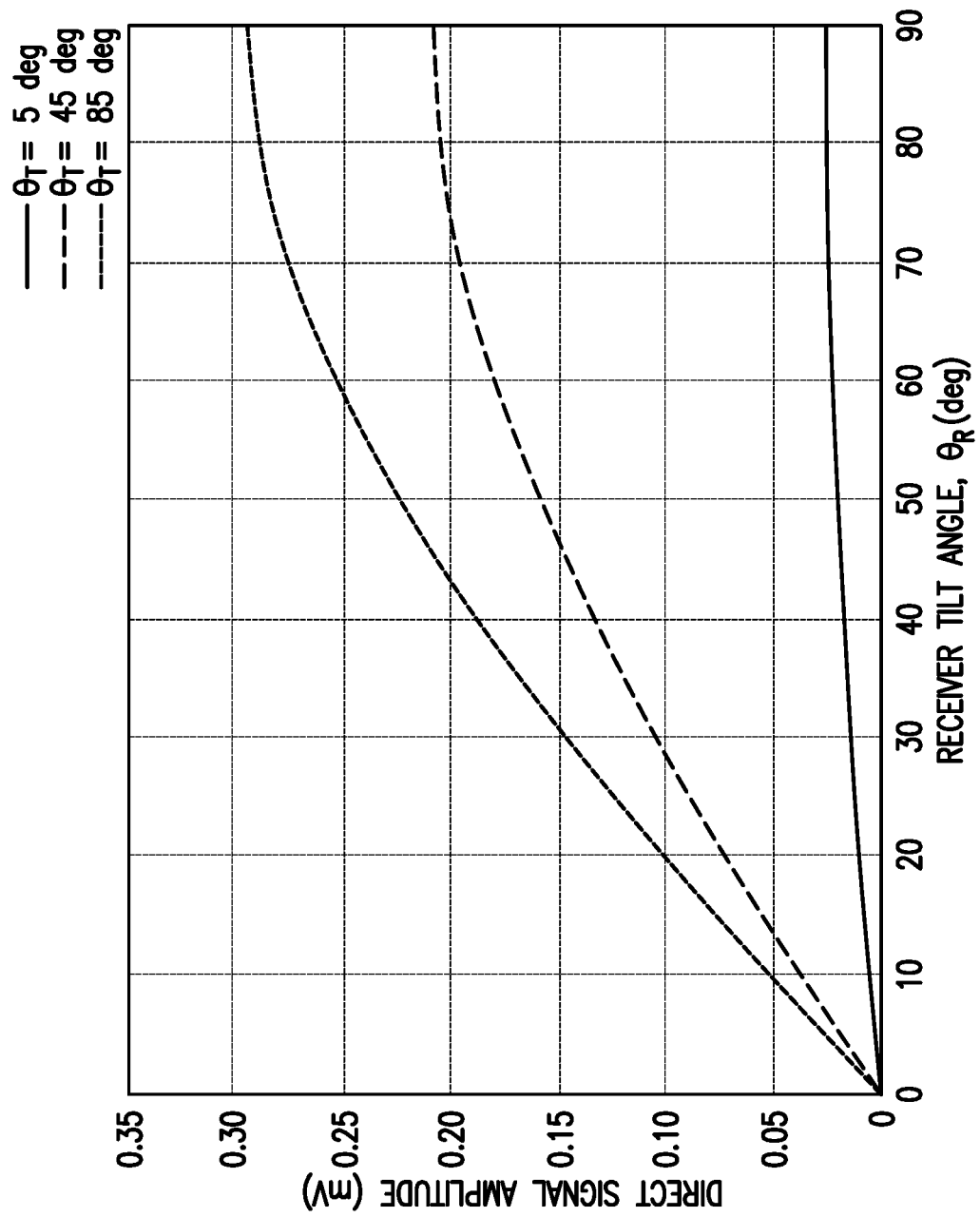
FIG. 5B illustrates a graph showing an effect of a transmitting tilted coil tilt angle adjustment: Target Signals vs. Receiver Tilt Angles.

FIGS. 5A and 5B show the direct signal amplitude and the target signal amplitude for different transmitter tilt angles of $\theta_T=5°$, 45°, and 85°. As seen in FIG. 5B the higher transmitter tilt angle, the higher the target signal may be. Therefore, in order to have a maximum signal excited on the target wellbore 104 (shown in FIG. 1), the tilt angle of the transmitter (e.g., transmitter 136 (shown in FIG. 1)) may be $\theta_T=90°$. But on the other hand, cancelation of direct signal may also be considered in the design. FIG. 5A shows the signal ratio vs. receiver tilt angles for different transmitter tilt angle. On the plot, the level of the target signal is also shown where the direct signal is eliminated. By comparing the three curves in FIG. 5A, it can be observed that the combination of $\theta_T=45°$ and $\theta_R=63.4°$ may provide a stronger target signal besides direct signal elimination. FIG. 5A illustrates a graph showing an effect of transmitter 136 (shown in FIG. 1) tilt angle adjustment: Direct Coupling Signals vs. Receiver Tilt Angles (Freq.=2 kHz, $\theta_T=45°$, $R_f=10\Omega$.m, D=10 m, θ=0°. FIG. 5B illustrates a graph showing an effect of transmitter 136 (shown in FIG. 1) tilt angle adjustment: Target Signals vs. Receiver Tilt Angles (Freq.=2 kHz, $\theta_T$=45°, $R_f$=10Ω.m, D=10 m, θ=0°.

Figure 7:
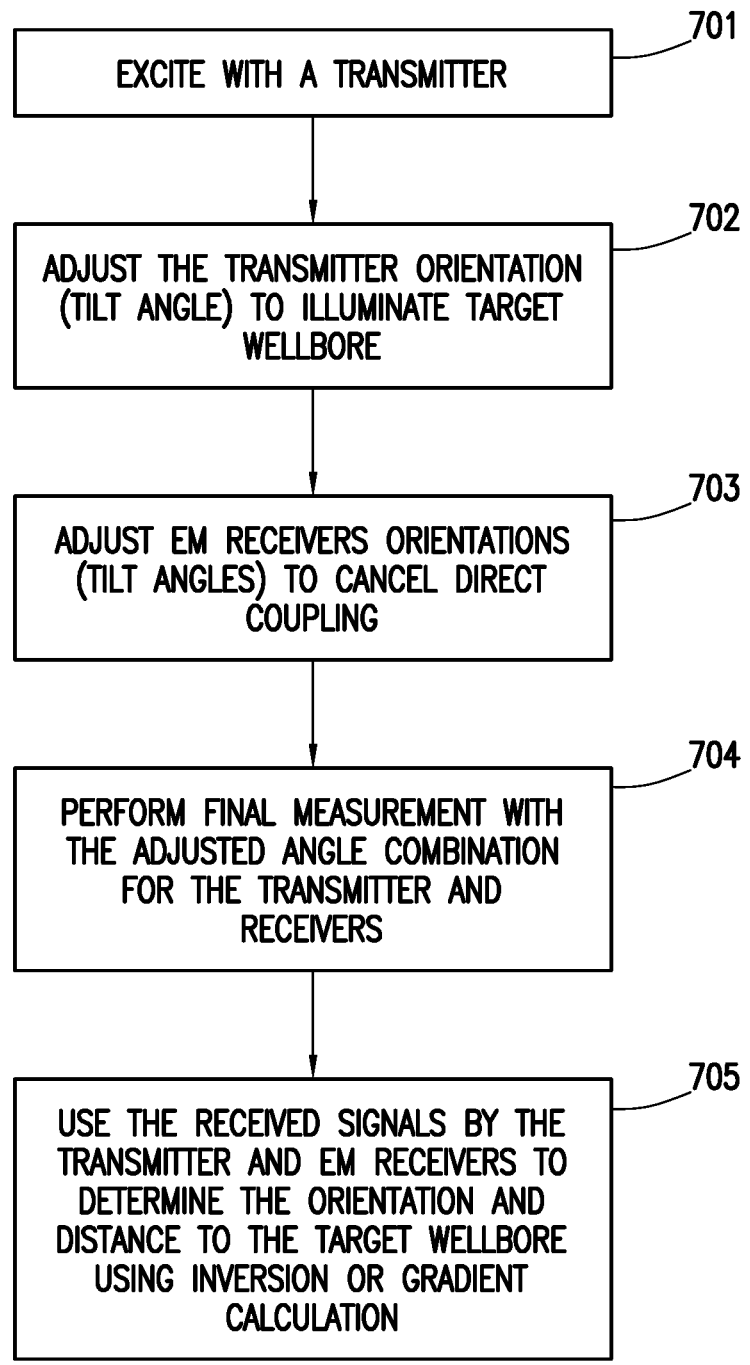
FIG. 7 illustrates a flow diagram for adjusting a sensor's orientation.
Figure 8:
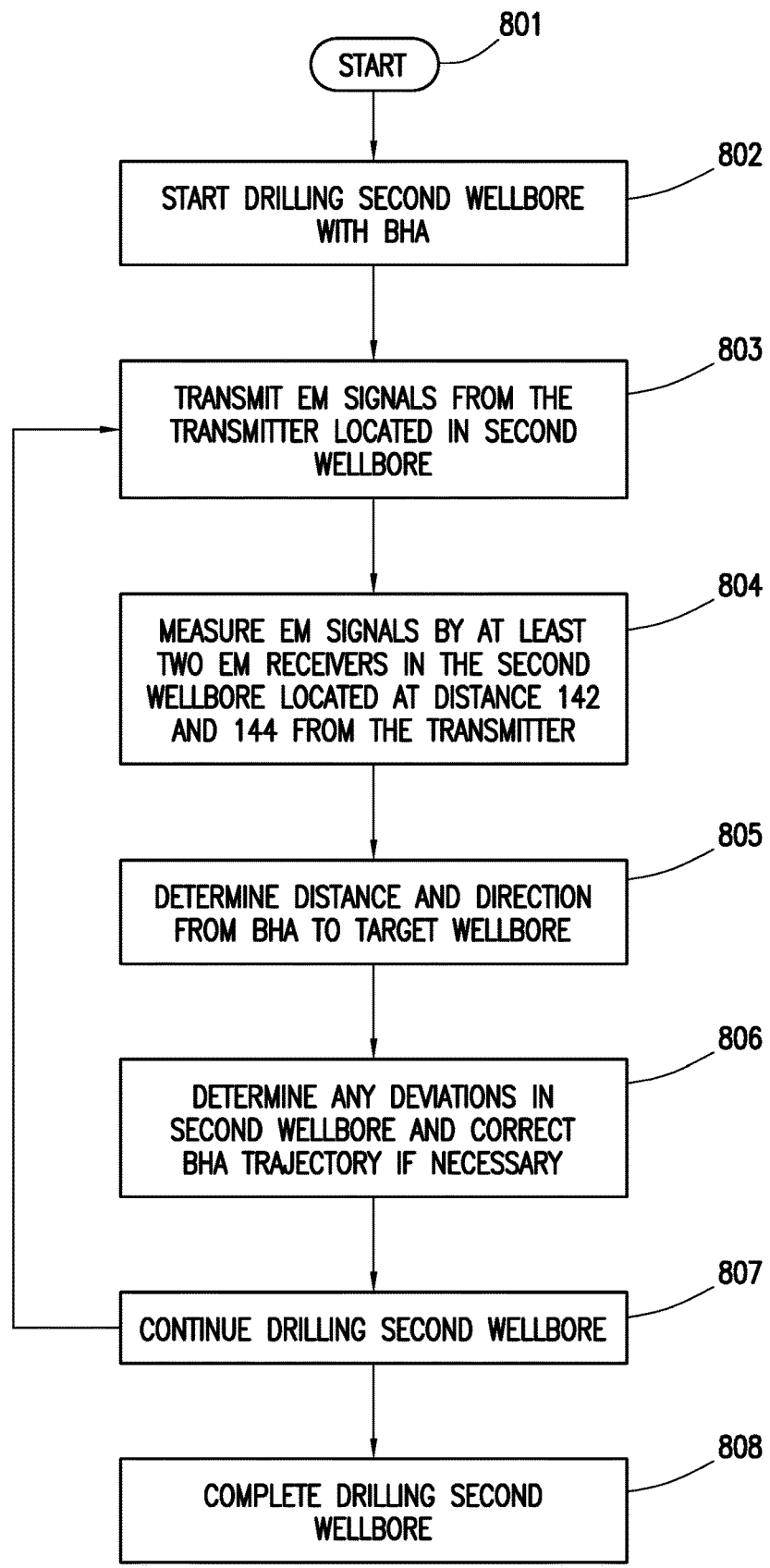
FIG. 8 illustrates a flow diagram for electromagnetic ranging in a SAGD oilfield operation.

So as a method to adjust the transmitter and receiver coils' orientations, one may need to examine the target signal level and also direct signal level for different $\theta_R$ and $\theta_T$ and then select the appropriate combination which provides the highest target signal besides direct coupling cancelation. FIG. 7 below shows a workflow of the process of adjusting sensors orientation. FIG. 8 below presents an example workflow of how the whole system can be operated in a drilling process.

Figure 6A:
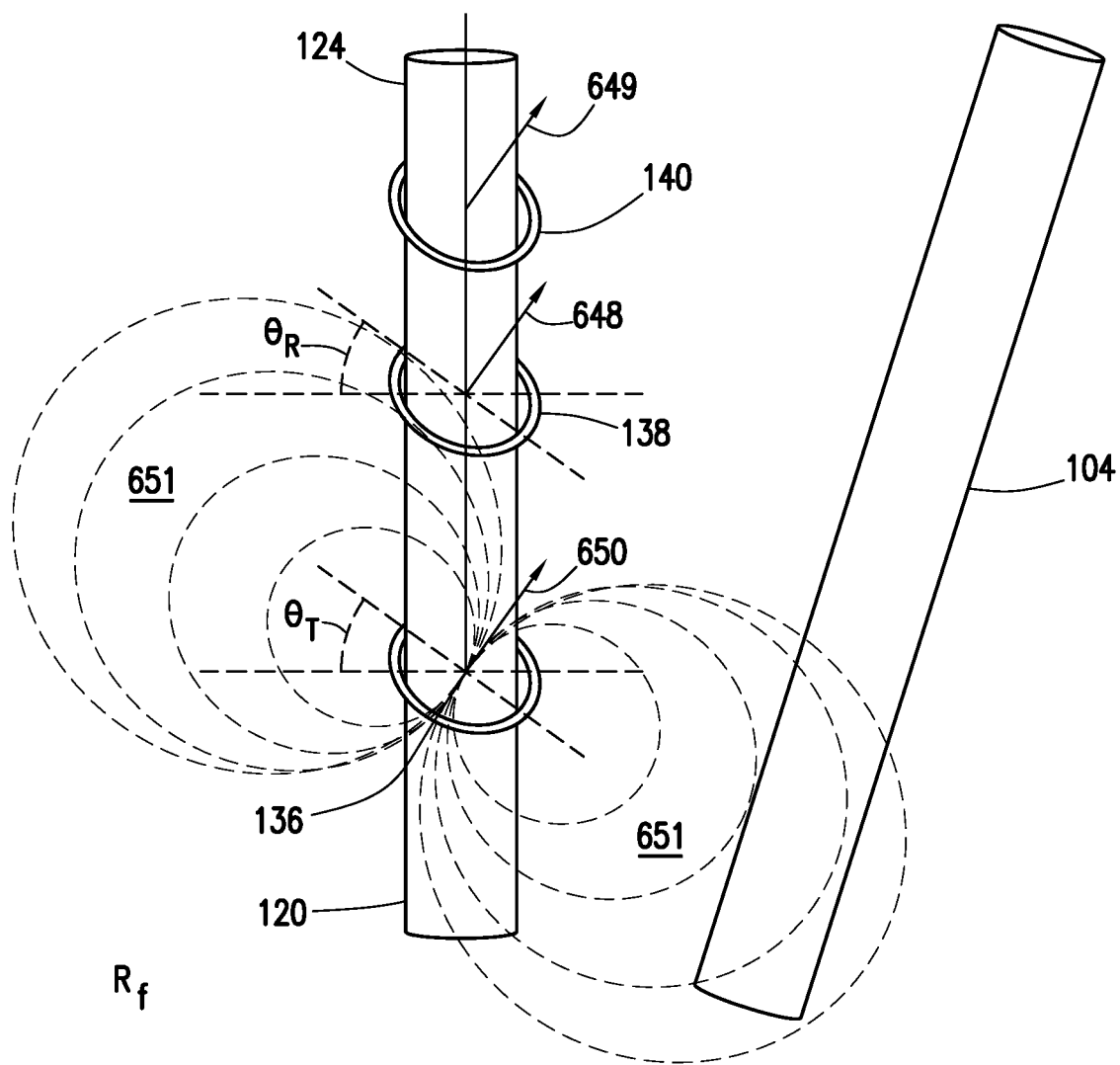
FIG. 6A illustrates performance enhancement via adjusting a transmitting tilted coil and receivers tilt angles: Direct Signal Elimination.

FIG. 6A illustrates an example configuration for direct signal elimination. As illustrated, an EM ranging tool 124 may be provided that comprises transmitter 136, and EM receivers 138, 140) tilt angles: Direct Signal Elimination. EM receivers 138, 140 may include magnetic dipoles 648, 649, respectively, which may be perpendicular to OR. Transmitter 136 may include magnetic dipole 650. Magnetic fields 651 may be emitted from transmitter 136 and received by EM receivers 138 and 140. The angles may be adjusted mechanically or synthetically or transmitter 136 and EM receivers 138 and 140 may be placed on EM ranging tool 124 having the specific tilt angles.

Figure 6B:
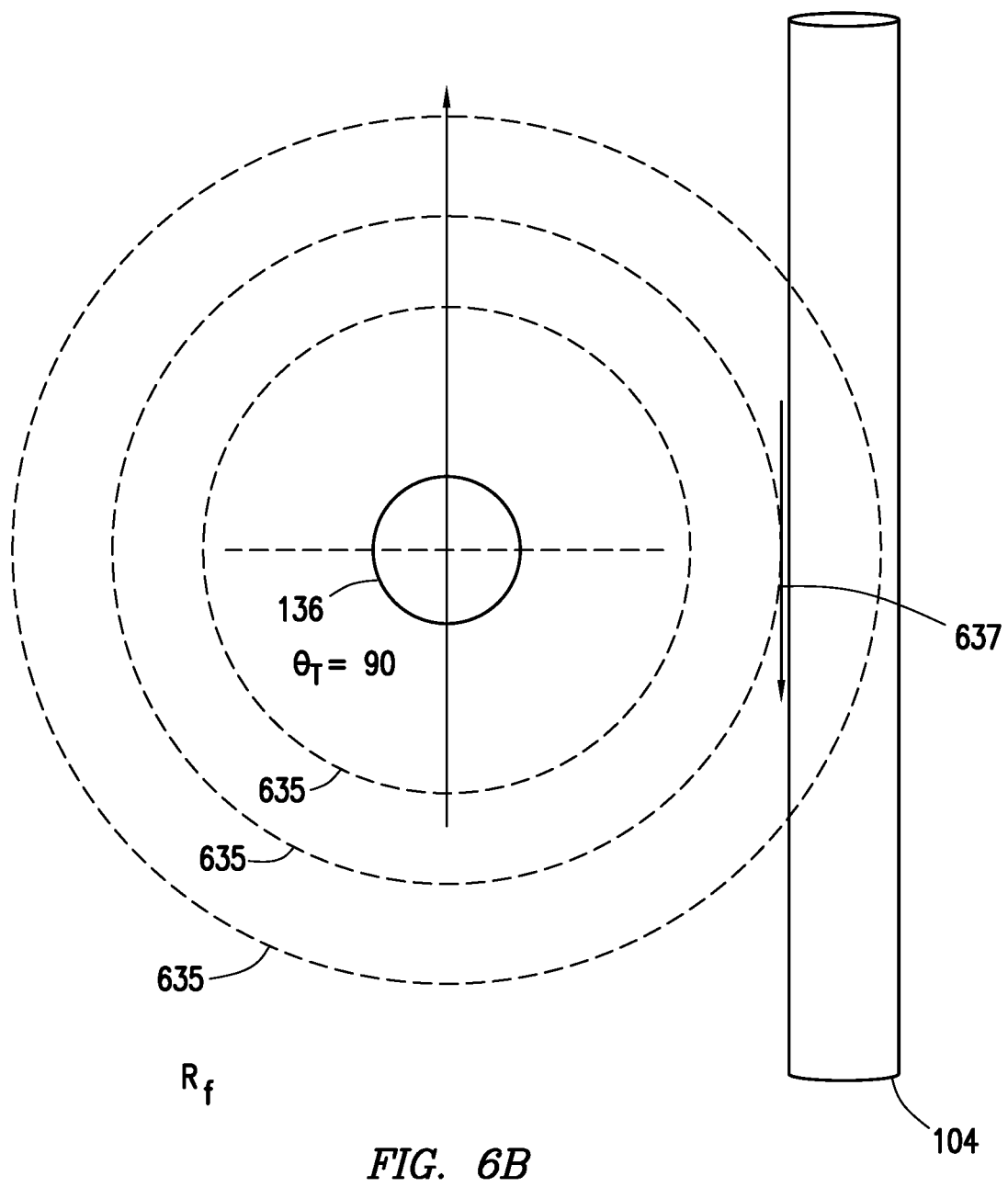
FIG. 6B illustrates performance enhancement via adjusting a transmitting tilted coil and receivers tilt angles: Target Well Excitation Enhancement.

FIG. 6B illustrates performance enhancement via adjusting sensors (e.g., transmitter 136, EM receivers 138, 140) tilt angles: Target Well Excitation Enhancement. Transmitter 136 (θT=90°) may emit electrical fields 635. Electrical fields 635 may intersect target wellbore 104 at electric field tangent 637. The angles may be adjusted mechanically or synthetically or transmitter 136 and EM receivers 138 and 140 may be placed on EM ranging tool 124 having the specific tilt angles.

As explained earlier, in this method, tilted coils (e.g., transmitter 136, receivers 138, 140, shown on FIG. 6A) may be mounted on the EM ranging tool 124 (shown on FIG. 6A) to induce currents on the nearby target wellbore 104 (shown on FIG. 6A). The secondary magnetic field created by these induced currents may then be detected by magnetometers or tilted coil(s) (e.g., receivers 138, 140) mounted on the EM ranging tool 124. As shown previously, there may be one possible receiver (e.g., receivers 138, 140) tilt angle at a given transmitter (e.g., transmitter 136) angle to eliminate the direct signal. Another parameter that may be important to design such a ranging system may be the level of signal that is scattered from the target wellbore 104. This scattering signal which may be denoted as "target signal" may depend on the strength of the current induced on the target wellbore 104. A parameter which may play an important role on the induced current strength may be the orientation of transmitter 136 in respect to the target wellbore 104. The maximum induction on the target wellbore 104 may occur when the tangent line (e.g., electric field tangent 637) of the electric field (e.g., electrical fields 635) of the transmitting tilted coil 636 is parallel to the axis of the target wellbore 104. On the other hand, the receivers (e.g., EM receivers 138, 140) may be tilted in a way that provides direct signal cancelation. So to design an optimum orientation for transmitter 136 and EM receivers 138 and 140, one may need to consider both target signal and also target-to-direct signal ratios. It may also be possible to adjust the receiver tilt angle to optimize sensitivity to a target wellbore 104 (shown in FIG. 1), as well. This may not result in the direct signal cancellation, so it may be used in situations where direct signal may not be a problem, but sensitivity may. In order to accomplish this, receiver tilt angle or orientation may be adjusted such that the target wellbore 104 may be in the same plane with the receiver coil (e.g., EM receivers 138, 140).

Figure 6C:
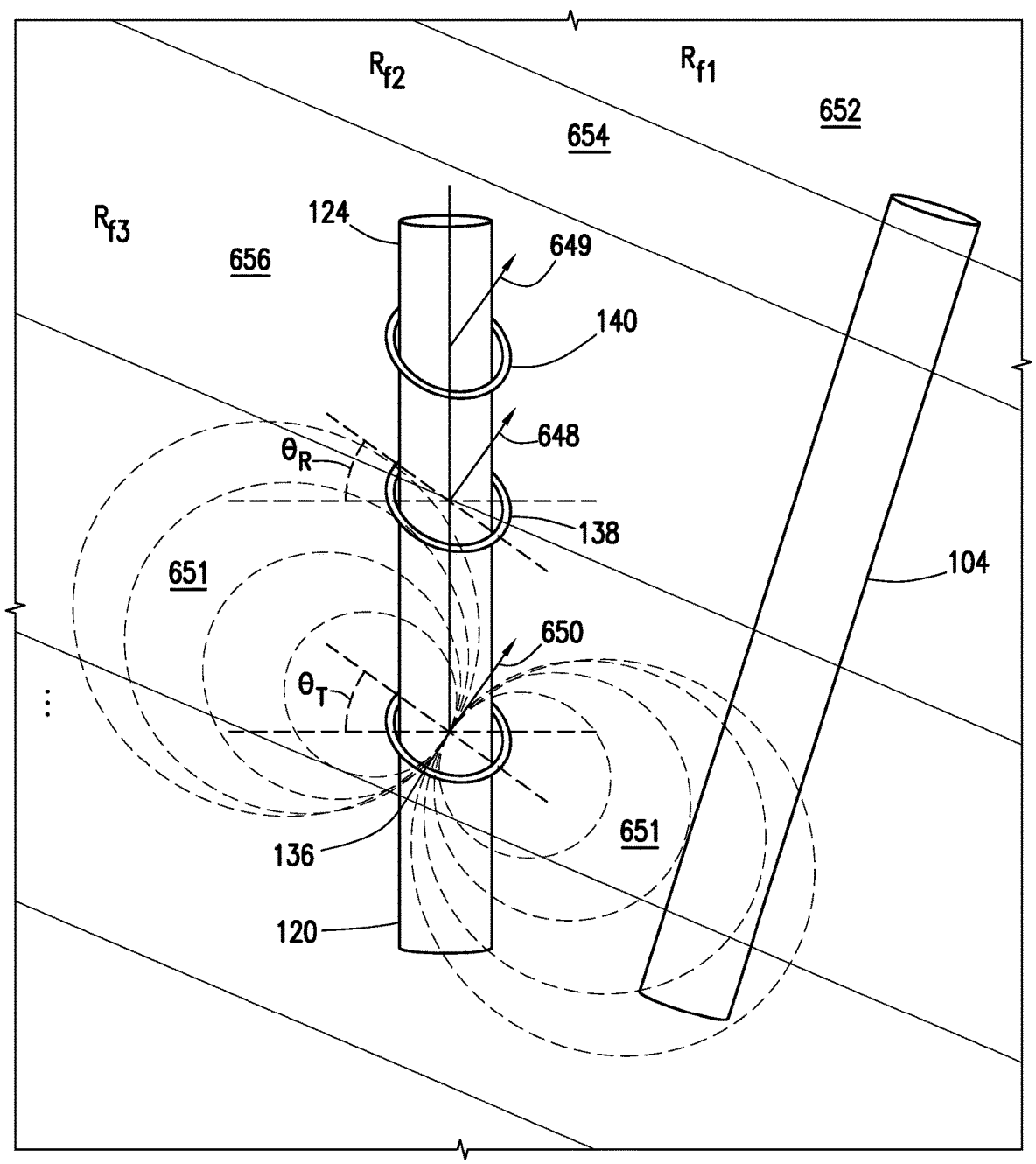
FIG. 6C illustrates performance enhancement via adjusting a transmitting tilted coil and receivers tilt angles: Effect of Layered Formation Elimination.

FIG. 6C illustrates performance enhancement via adjusting sensors (e.g., transmitter 136, EM receivers 138, 140) tilt angles: Effect of Layered Formation Elimination. EM receivers 138, 140 may include magnetic dipoles 648, 649, respectively. Transmitter 136 may include magnetic dipole 650. Magnetic fields 651 may be emitted from transmitter 136 and received by EM receivers 138 and 140. The formation may comprise layer 652, layer 654 and layer 656 which may comprise formation resistivity $R_{f1}$, $R_{f2}$ and $R_{f3}$, respectively. The angles may be adjusted mechanically or synthetically or transmitter 136 and EM receivers 138 and 140 may be placed on EM ranging tool 124 having the specific tilt angles. The EM ranging tool 124 with transmitter 136 and EM receivers 138, 140 may be used in a formation with layered structure having different resistivity. To eliminate the effect of the layers on the measurement, the transmitter 136 or EM receivers 138, 140 may be aligned in parallel to layers so that the dipole moment of the sensor being perpendicular to the layered direction as shown in FIG. 6C.

FIG. 7 illustrates a flow diagram for adjusting orientation of a transmitter or EM receiver. Block 701 may include excitation of a transmitter (e.g., transmitter 136 (shown in FIG. 1)) to induce current on a target wellbore 104 (shown in FIG. 1). Then in block 702, the transmitter's orientation (e.g., tilt angle) may be adjusted to illuminate a target wellbore 104 (shown in FIG. 1). By adjusting the orientation of the transmitter, the target wellbore 104 may be illuminated more efficiently. In block 703, the EM receivers' (e.g., EM receivers 138, 140 (shown in FIG. 1)) orientation (e.g., tilt angle) may be adjusted to cancel direct coupling. By adjusting of the orientation, the target signal (e.g., electromagnetic signal from target wellbore) may be received more efficiently. In block 704, a final measurement with the adjusted tilt angles for the transmitter and EM receivers may be performed. In block 705, the received signals by the different sensors (e.g., transmitter 136 (shown in FIG. 1), EM receivers 138, 140 (shown in FIG. 1)) may be used in an inversion or gradient calculation to determine ranging parameters, including, the orientation and distance to the target wellbore 104 (shown in FIG. 1).

FIG. 8 illustrates a flow diagram for electromagnetic ranging in a SAGD oilfield operation. The method may begin in block 801. In block 802, the drilling of a second wellbore 114 (shown in FIG. 1) with BHA 122 (shown in FIG. 1) may start. Then in block 803, EM signals may be transmitted from a transmitter (e.g., transmitter 136 (shown in FIG. 1)), The transmitter may be located on a BHA 122, for example, as shown on FIG. 1. Then in block 804, EM signals may be measured by at least two coil EM receivers (e.g., EM receivers 138, 140 (shown in FIG. 1)) at a distance (e.g., distance 142 and 144 shown in FIG. 2A) from the transmitter. In block 805, at least one ranging parameter (e.g., distance and direction from BHA 122 to target wellbore 104) may be determined. The ranging parameters may be determined using any suitable technique, including, inversion or gradient calculations. Then in block 806, any deviations in second wellbore 114 may be determined, based at least partially on the at least one ranging parameter, and a trajectory of BHA 122 to target wellbore 104 may be corrected. In block 807, second wellbore 114 may continue to be drilled. Then in block 808, the drilling of second wellbore 114 may be completed.

As will be appreciated, the previously disclosed techniques may be used in a wide variety of methods and systems. A method for electromagnetic ranging of a target wellbore may include disposing an electromagnetic ranging tool in a wellbore, wherein the electromagnetic ranging tool comprises an electromagnetic transmitter and an electromagnetic receiver; exciting a subterranean formation with the electromagnetic transmitter; adjusting at least one orientation of the electromagnetic transmitter, the electromagnetic receiver, or both the electromagnetic transmitter and the electromagnetic receiver; exciting the target wellbore with the electromagnetic transmitter; measuring at least one component of an electromagnetic signal from the target wellbore with the electromagnetic receiver; and determining at least one ranging parameter of the target wellbore based, at least in part, on the at least one component of the electromagnetic signal measured by the electromagnetic receiver. The adjusting the at least one orientation may comprise at least partially cancelling direct signal coupling between the electromagnetic transmitter and the electromagnetic receiver. The adjusting the at least one orientation may comprise maximizing the electromagnetic signal from the target wellbore. The adjusting the at least one orientation may comprise orientating at least one of the electromagnetic transmitter or the electromagnetic receiver such that a normal plane to a dipole moment of the electromagnetic transmitter of the electromagnetic receiver contains the target wellbore. The adjusting the at least one orientation may comprise maximizing an electromagnetic signal from the subterranean formation. The adjusting the at least one orientation may comprise orientating at least one of the electromagnetic transmitter or the electromagnetic receiver such that a normal plane to a dipole moment of the electromagnetic transmitter of the electromagnetic receiver is perpendicular to a layer of the subterranean formation. The adjusting the at least one orientation was performed during design of the electromagnetic ranging tool such that the electromagnetic transmitter, the electromagnetic receiver, or both the electromagnetic transmitter and the electromagnetic receiver were installed on the electromagnetic ranging with the adjusted at least one orientation. The adjusting the at least one orientation may comprise synthetically adjusting at least one orientation of the electromagnetic transmitter, the electromagnetic receiver, or both the electromagnetic transmitter and the electromagnetic receiver. The adjusting the at least one orientation may comprise mechanically adjusting at least one orientation of the electromagnetic transmitter, the electromagnetic receiver, or both the electromagnetic transmitter and the electromagnetic receiver. The electromagnetic receiver may comprise a coil receiver, a magnetometer, or a solenoid and wherein the electromagnetic transmitter comprises a coil transmitter or a solenoid.

A method for electromagnetic ranging of a target wellbore may comprise drilling a well with a bottom hole assembly, wherein the bottom hole assembly comprises an electromagnetic ranging tool, wherein the electromagnetic ranging tool comprises a electromagnetic transmitter and at least two electromagnetic receivers; exciting a subterranean formation with the electromagnetic transmitter; adjusting a tilt angle of the electromagnetic transmitter; adjusting tilt angles of the at least two coil receivers to, at least partially, cancel direct signal coupling between the electromagnetic transmitter and the at least two electromagnetic receivers; exciting the target wellbore with the electromagnetic transmitter; measuring at least one component of an electromagnetic signal from the target wellbore after the tilt angles of the at least two electromagnetic receivers and the tilt angle of the electromagnetic transmitter have been adjusted; determining at least one ranging parameter of the target wellbore based, at least in part, on the at least one component of the electromagnetic signal measured by the at least two electromagnetic receivers; determining deviations in path of the well drilled with the bottom hole assembly based, at least in part, on the at least one ranging parameter; correcting a trajectory of the bottom hole assembly trajectory based, at least in part, on the determined deviations; and continuing drilling the well with the bottom hole assembly. At least one of the electromagnetic transmitter or the at least two electromagnetic receivers may be adjusted such that a normal plane to a dipole moment of the electromagnetic transmitter or the at least two electromagnetic receivers may be perpendicular to a layer of the subterranean formation. At least one of the electromagnetic transmitter or the at least two electromagnetic receivers may be adjusted such that a normal plane to a dipole moment of the electromagnetic transmitter or the at least two electromagnetic receivers contains the target wellbore. The adjusting the tilt angle of the electromagnetic transmitter and the adjusting the tilt angle of the at least two electromagnetic receivers may be done synthetically. The adjusting the tilt angle of the electromagnetic transmitter and the adjusting the tilt angle of the at least two electromagnetic receivers may be done mechanically. The at least two electromagnetic receivers each individually may comprise a coil receiver, a magnetometer, or a solenoid and wherein the electromagnetic transmitter comprises a coil transmitter or a solenoid.

A system may comprise an electromagnetic ranging tool, wherein the electromagnetic ranging tool comprises a electromagnetic transmitter that may excite a casing string and an electromagnetic receiver operable to measure at least one component of an electromagnetic field; and an information handling system in signal communication with the electromagnetic ranging tool, wherein the information handling system may be operable to adjust at least one orientation of the electromagnetic transmitter, the electromagnetic receiver, or both the electromagnetic transmitter and the electromagnetic receiver. The information handling system may be disposed on the electromagnetic ranging tool. The information handling system may be operable to synthetically or mechanically adjust the at least one orientation. The electromagnetic receiver may comprise a coil receiver, a magnetometer, or a solenoid and wherein the electromagnetic transmitter comprises a coil transmitter or a solenoid.

The preceding description provides various examples of the systems and methods of use disclosed herein which may contain different method steps and alternative combinations of components. It should be understood that, although individual examples may be discussed herein, the present disclosure covers all combinations of the disclosed examples, including, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for electromagnetic ranging of a target wellbore, comprising:
   drilling a well with a bottom hole assembly, wherein the bottom hole assembly comprises an electromagnetic ranging tool, wherein the electromagnetic ranging tool comprises an electromagnetic transmitter and an electromagnetic receiver;
   adjusting at least one orientation of the electromagnetic transmitter to induce a current on the target wellbore and form an electromagnetic signal from the target wellbore;
   exciting a subterranean formation with the electromagnetic transmitter with a first electromagnetic signal to induce the current on the target wellbore and form the electromagnetic signal from the target wellbore;
   adjusting at least one orientation of the electromagnetic receiver to optimize sensitivity to the current on the target wellbore;
   measuring at least one component of the electromagnetic signal from the target wellbore with the electromagnetic receiver to locate the target wellbore;
   adjusting the at least one orientation of the electromagnetic receiver to cancel direct coupling between the electromagnetic transmitter and the electromagnetic receiver;
   exciting the target wellbore with the electromagnetic transmitter with a second electromagnetic signal; and
   determining at least one ranging parameter of the target wellbore based, at least in part, on the at least one component of the electromagnetic signal from the target wellbore.

2. The method of claim 1, wherein adjusting the at least one orientation of the electromagnetic transmitter or adjusting the at least one orientation of the electromagnetic receiver comprises maximizing the electromagnetic signal from the target wellbore.

3. The method of claim 2, wherein adjusting the at least one orientation of the electromagnetic transmitter or adjusting the at least one orientation of the electromagnetic receiver comprises orientating at least one of the electromagnetic transmitter or the electromagnetic receiver such that a normal plane to a dipole moment of the electromagnetic transmitter or the electromagnetic receiver contains the target wellbore.

4. The method of claim 1, wherein adjusting the at least one orientation of the electromagnetic transmitter or adjusting the at least one orientation of the electromagnetic receiver comprises minimizing an electromagnetic signal from the subterranean formation.

5. The method of claim 4, wherein adjusting the at least one orientation of the electromagnetic transmitter or adjusting the at least one orientation of the electromagnetic receiver comprises orientating at least one of the electromagnetic transmitter or the electromagnetic receiver such that a normal plane to a dipole moment of the electromagnetic transmitter or the electromagnetic receiver is perpendicular to a layer direction of the subterranean formation.

6. The method of claim 1, wherein adjusting the at least one orientation of the electromagnetic transmitter or adjusting the at least one orientation of the electromagnetic receiver was performed during design of the electromagnetic ranging tool such that the electromagnetic transmitter, the electromagnetic receiver, or both the electromagnetic transmitter and the electromagnetic receiver were installed on the electromagnetic ranging tool with the at least one orientation adjusted.

7. The method of claim 1, wherein adjusting the at least one orientation of the electromagnetic transmitter or adjusting the at least one orientation of the electromagnetic receiver comprises synthetically adjusting the at least one orientation of the electromagnetic transmitter, the at least one orientation of the electromagnetic receiver, or both the at least one orientation of the electromagnetic transmitter and the at least one orientation of the electromagnetic receiver.

8. The method of claim 1, wherein adjusting the at least one orientation of the electromagnetic transmitter or adjusting the at least one orientation of the electromagnetic receiver comprises mechanically adjusting the at least one orientation of the electromagnetic transmitter, the at least one orientation of the electromagnetic receiver, or both the at least one orientation of the electromagnetic transmitter and the at least one orientation of the electromagnetic receiver.

9. The method of claim 1, wherein the electromagnetic receiver comprises a coil receiver, a magnetometer, or a solenoid, and wherein the electromagnetic transmitter comprises a coil transmitter or a solenoid.

10. A method for electromagnetic ranging of a target wellbore,
    comprising:
    drilling a well with a bottom hole assembly, wherein the bottom hole assembly comprises an electromagnetic ranging tool, wherein the electromagnetic ranging tool comprises an electromagnetic transmitter and at least two electromagnetic receivers;
    adjusting at least one orientation of the electromagnetic transmitter to induce a current on the target wellbore and form an electromagnetic signal from the target wellbore;

exciting a subterranean formation with the electromagnetic transmitter with a first electromagnetic signal to induce the current on the target wellbore and form the electromagnetic signal from the target wellbore;

adjusting at least one orientation of the at least two electromagnetic receivers to optimize sensitivity to the current on the target wellbore;

measuring at least one component of the electromagnetic signal from the target wellbore with the at least two electromagnetic receivers;

adjusting tilt angles the at least one orientation of the at least two electromagnetic receivers to, at least partially, cancel direct signal coupling between the electromagnetic transmitter and the at least two electromagnetic receivers;

determining at least one ranging parameter of the target wellbore based, at least in part, on the at least one component of the electromagnetic signal from the target wellbore;

determining deviations in a path of the well drilled with the bottom hole assembly based, at least in part, on the at least one ranging parameter;

correcting a trajectory of the bottom hole assembly based, at least in part, on the determined deviations; and continuing drilling the well with the bottom hole assembly.

11. The method of claim 10, wherein at least one of the electromagnetic transmitter or the at least two electromagnetic receivers are adjusted such that a normal plane to a dipole moment of the electromagnetic transmitter or the at least two electromagnetic receivers is perpendicular to a layer direction of the subterranean formation.

12. The method of claim 10, wherein at least one of the electromagnetic transmitter or the at least two electromagnetic receivers are adjusted such that a normal plane to a dipole moment of the electromagnetic transmitter or the at least two electromagnetic receivers contains the target wellbore.

13. The method of claim 10, wherein adjusting the at least one orientation of the electromagnetic transmitter and adjusting the at least one orientation of the at least two electromagnetic receivers is done synthetically.

14. The method of claim 10, wherein adjusting the at least one orientation of the electromagnetic transmitter and adjusting the at least one orientation of the at least two electromagnetic receivers is done mechanically.

15. The method of claim 10, wherein the at least two electromagnetic receivers each individually comprise a coil receiver, a magnetometer, or a solenoid, and wherein the electromagnetic transmitter comprises a coil transmitter or a solenoid.

16. A system comprising:
an electromagnetic ranging tool, wherein the electromagnetic ranging tool comprises:
an electromagnetic transmitter that is configured to:
adjust at least one orientation of the electromagnetic transmitter to induce a current on a target wellbore and form an electromagnetic signal from the target wellbore; and
excite a subterranean formation with a first electromagnetic signal to induce the current on the target wellbore and form the electromagnetic signal from the target wellbore;
an electromagnetic receiver that is configured to:
adjust at least one orientation of the electromagnetic receiver to optimize sensitivity to the current on the target wellbore;
measure at least one component of electromagnetic signal from the target wellbore to locate the target wellbore; and
adjust at least one orientation of the electromagnetic receiver to cancel direct coupling between the electromagnetic transmitter and the electromagnetic receiver; and
an information handling system in signal communication with the electromagnetic ranging tool, wherein the information handling system is operable to:
determine at least one ranging parameter of the target wellbore based, at least in part, on the at least one component of the electromagnetic signal from the target wellbore.

17. The system of claim 16, wherein the information handling system is disposed on the electromagnetic ranging tool.

18. The system of claim 16, wherein the information handling system is operable to synthetically or mechanically adjust the at least one orientation of the electromagnetic transmitter or the at least one orientation of the electromagnetic receiver.

19. The system of claim 16, wherein the electromagnetic receiver comprises a coil receiver, a magnetometer, or a solenoid, and wherein the electromagnetic transmitter comprises a coil transmitter or a solenoid.

* * * * *